United States Patent
Chen et al.

(10) Patent No.: US 7,536,426 B2
(45) Date of Patent: May 19, 2009

(54) HYBRID OBJECT PLACEMENT IN A DISTRIBUTED STORAGE SYSTEM

(75) Inventors: Wei Chen, Beijing (CN); Chao Jin, Beijing (CN); Dan Teodosiu, Kirkland, WA (US); Qiao Lian, Beijing (CN); Shiding Lin, Beijing (CN); Yu Chen, Beijing (CN); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 11/193,797

(22) Filed: Jul. 29, 2005

(65) Prior Publication Data

US 2007/0027916 A1    Feb. 1, 2007

(51) Int. Cl.
G06F 12/00 (2006.01)
G06F 17/30 (2006.01)
G06F 17/00 (2006.01)

(52) U.S. Cl. ................ 707/204; 707/201; 707/202; 707/203

(58) Field of Classification Search ............ 707/9, 707/1, 5, 10, 104.1, 200, 201–205; 709/201, 709/202, 213, 217, 219
See application file for complete search history.

(56) References Cited

U.S. PATENT DOCUMENTS

| | | | |
|---|---|---|---|
| 5,963,944 A | 10/1999 | Adams | |
| 6,038,689 A | 3/2000 | Schmidt | |
| 6,044,444 A | 3/2000 | Ofek | |
| 6,115,830 A | 9/2000 | Zabarsky | |
| 6,338,092 B1 | 1/2002 | Chao | |
| 6,694,450 B1 * | 2/2004 | Kidder et al. | 714/15 |
| 6,983,362 B1 * | 1/2006 | Kidder et al. | 713/1 |
| 7,020,665 B2 * | 3/2006 | Douceur et al. | 707/200 |
| 7,054,892 B1 | 5/2006 | Phillips | |
| 7,065,618 B1 * | 6/2006 | Ghemawat et al. | 711/161 |
| 7,107,419 B1 * | 9/2006 | Ghemawat et al. | 711/162 |
| 7,130,870 B1 * | 10/2006 | Pecina et al. | 707/203 |
| 7,191,358 B2 * | 3/2007 | Fujibayashi | 714/6 |
| 7,239,605 B2 | 7/2007 | Dinker | |
| 7,263,590 B1 * | 8/2007 | Todd et al. | 711/165 |

(Continued)

OTHER PUBLICATIONS

Office Action dated Jun. 20, 2008 cited in related U.S. Appl. No. 10/993,536 (Copy Attached).

(Continued)

*Primary Examiner*—Cam Y T Truong
*Assistant Examiner*—Cecile Vo
(74) *Attorney, Agent, or Firm*—Workman Nydegger

(57) ABSTRACT

Described is the differentiation of replicas in a large distributed object store as either being smoothing replicas based on an amount of load on storage nodes (bricks), or as spreading replicas based on a substantially random distribution among the system's bricks. The smoothing replicas are placed among the lowest usage bricks, while the spreading replicas are placed randomly throughout other bricks in the system independent of load. As a result, fast, primarily parallel data repair is facilitated by selecting a spreading replica when repair is needed, while load balancing is facilitated by placing a smoothing replica on a low-usage brick when a new replica is checked in, and selecting a smoothing replica when load balancing is triggered by overloading of a brick and/or addition of a new brick. Check-in, data repair and load balancing policies specify how to use smoothing replicas and spreading replicas.

12 Claims, 5 Drawing Sheets

U.S. PATENT DOCUMENTS

| | | | |
|---|---|---|---|
| 7,275,177 B2 * | 9/2007 | Armangau et al. | 714/5 |
| 7,293,024 B2 | 11/2007 | Bayliss | |
| 7,305,530 B2 | 12/2007 | Daniels | |
| 7,355,975 B2 | 4/2008 | Liu | |
| 7,363,316 B2 | 4/2008 | Anderson | |
| 7,363,326 B2 * | 4/2008 | Margolus | 707/201 |
| 7,389,313 B1 * | 6/2008 | Hsieh et al. | 707/204 |
| 2002/0124013 A1 | 9/2002 | Loy | |
| 2003/0037149 A1 | 2/2003 | Hess | |
| 2003/0105993 A1 | 6/2003 | Colrain | |
| 2003/0187847 A1 * | 10/2003 | Lubbers et al. | 709/9 |
| 2004/0088382 A1 * | 5/2004 | Therrien et al. | 709/219 |
| 2005/0187992 A1 * | 8/2005 | Prahlad et al. | 707/204 |
| 2006/0026219 A1 * | 2/2006 | Orenstein et al. | 707/204 |

OTHER PUBLICATIONS

Office Action dated Dec. 15, 2008 cited in U.S. Appl. No. 10/993,536 (Copy Attached).

* cited by examiner

HYBRID OBJECT PLACEMENT IN A DISTRIBUTED STORAGE SYSTEM

BACKGROUND

U.S. patent application Ser. No. 10/993,536, assigned to the assignee of the present invention, describes a distributed storage system for a large amount of immutable objects, possibly on the order of billions of objects. Such systems may be implemented with replicated objects and replicated index servers. These replicas as maintained in a flat namespace, referenced by a globally unique identifier (GUID) and in general have no locking semantics. In general, there are at least two replicas for each object, but more typically are three or four replicas for each object, depending on the owner's reliability policy.

To implement such a large storage system, the system combines many storage units, referred to as bricks (or nodes), where in general each brick has a processor (CPU), memory, and one or more disks for storage. In a large brick storage system, individual disk or brick failures are relatively frequent. To tolerate these failures, each object has multiple replicas placed among different bricks in the system, such that even if some replicas are not available due to disk or brick failures, others can still be accessed. Moreover, when a replica is lost, a new replica needs to be created on another brick that is different from the bricks that contain the remaining replicas. This is to keep the replication degree and maintain the reliability of the object. The process of copying replicas to newly selected bricks when a brick fails is called data repair. The brick from which the replica is copied is referred to as the repair source, and the new brick to which the replica is copied is referred to as the repair destination.

To facilitate data repair, it is desirable that data repair can be done in parallel by many bricks. For example, consider a brick that contains 200 GB of data. If that brick fails, and only one other brick acts as the repair source or destination during the copy of all replicas on the failed disk, it will take about 2.8 hours to complete the repair, given a disk bandwidth of around 20 MB per second. However, if 200 bricks are involved in repairing the 200 GB of data, in parallel (with 100 bricks as the repair sources and 100 bricks as the repair destinations), data repair of 200 GB disk can be done in 100 seconds. As can be readily appreciated, such fast parallel repair significantly reduces the window of data vulnerability, and thus fast repair is desirable to reduce system data loss and improve system reliability.

One way to achieve fast parallel repair is to place object replicas randomly among the bricks in the system, while ensuring that no one brick contains multiple copies of the same replica. In this scenario, when a brick fails, many other bricks in the system contain the remaining replicas that were hosted on the failed brick, so they can act as the repair sources, initiate repair by randomly selecting other bricks as the destinations, and start the data repair process mostly in parallel.

However, a pure random placement policy to facilitate fast repair is in conflict with the concept of load balancing. More particularly, as the system evolves and old, failed bricks are replaced by new bricks, newly added bricks will be much less loaded than the bricks that have been running in the system for a long time. If the loads are imbalanced, low-load bricks are not fully utilized, while high-load bricks receive most access requests and thus the overall system performance is reduced.

To address the load balancing issue, a placement policy may prefer low-load bricks over high-load bricks when placing new object replicas in the system. However, if not carefully designed, such load balancing policy may go against fast parallel repair. For example, if there are five bricks that have a relatively very small load when compared against the remaining bricks, and all or most new objects being checked in are put among these five bricks for load balancing purposes, then when one of the five bricks fails, the remaining four bricks need to perform most of the data repair task, whereby data repair can take a very long time.

SUMMARY

Briefly, various aspects of the present invention are directed towards differentiating replicas in a distributed object store as smoothing replicas based on an amount of load on bricks or as spreading replicas based on a substantially random distribution among the bricks. The smoothing replicas are placed (e.g., randomly) among the lowest usage bricks, and the spreading replicas are placed randomly throughout other bricks in the system independent of load. As a result, fast, primarily parallel data repair is facilitated by selecting a spreading replica when repair is needed, while load balancing is facilitated by placing a smoothing replica on a low-usage brick when a new replica is checked in, and selecting a smoothing replica when load balancing is triggered by load on a brick and/or addition of a new brick. At least one index that correlates replicas with bricks may be used to track whether each replica is a smoothing replica or a spreading replica.

A check-in policy may place one or more replicas as spreading replicas and at least one other replica as a smoothing replica. A data repair policy specifies selecting a spreading replica for copying if at least one spreading replica is available. A load balancing policy specifies selecting a smoothing replica for moving if at least one smoothing replica is available. Upon determining that a replica needs to be stored on at least one brick, as a result of check-in, data repair or load balancing, the corresponding policy is evaluated to establish whether to store the replica as a smoothing replica based on load, as a spreading replica based on distribution, or store at least one smoothing replica and at least one spreading replica.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
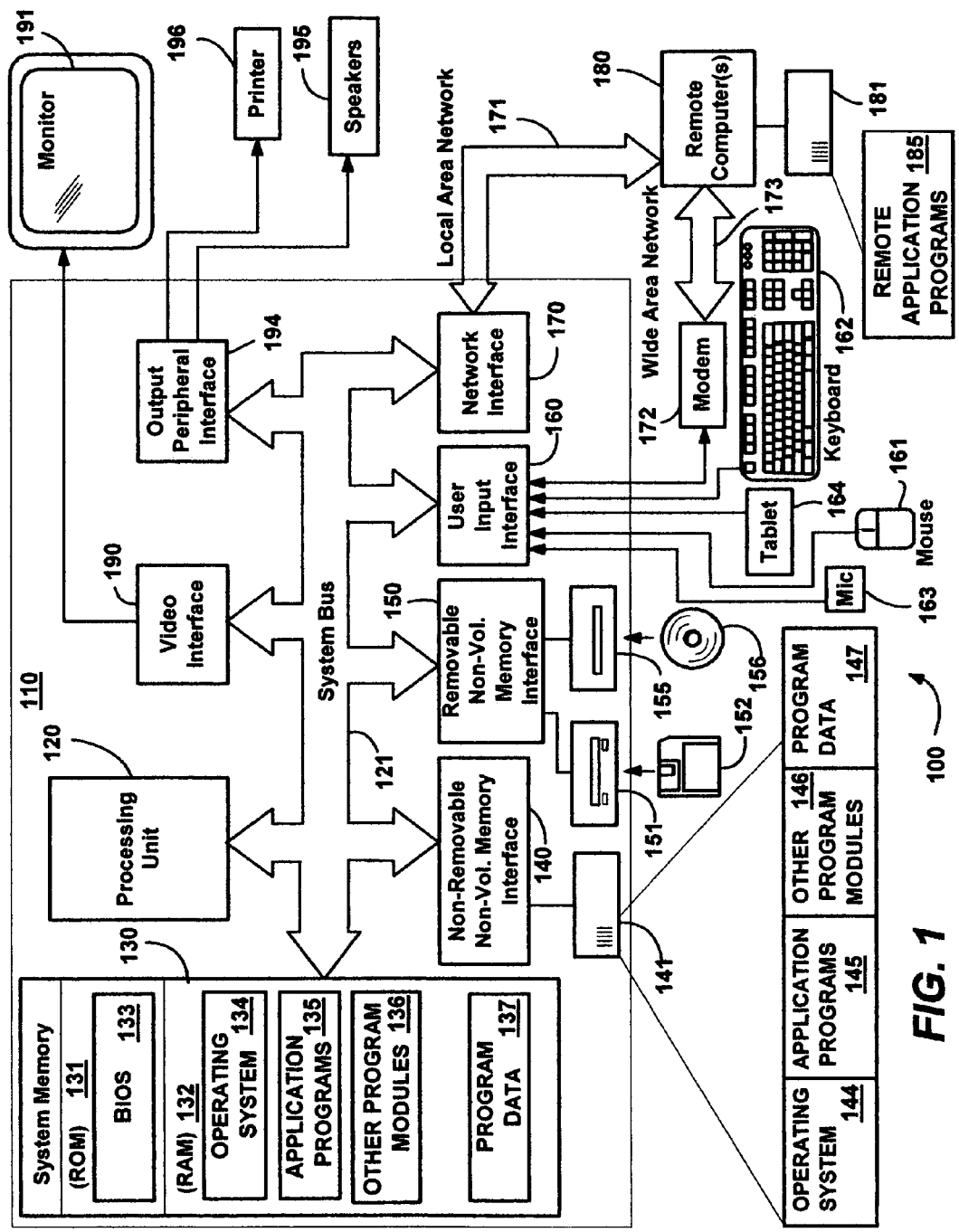
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may communication media. Computer storage medium includes volatile and nonvolatile storage medium, removable and non-removable storage medium implemented in any method or technology for storage of information such as computer-readable instructions, data structures, program modules or other data. Computer storage medium includes, but is not limited to, RAM, ROM, EEPROM, flash memory, CD-ROM, digital versatile disks (DVD) or other optical disk storage, magnetic cassettes, magnetic tape, magnetic disk storage or other magnetic storage devices, or any other storage medium which is used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Hybrid Object Placement for Parallel Repair and Load Balancing

Various aspects of the technology described herein are directed towards object replication among a number of storage units, referred to as bricks. In general, fast parallel repair and load balancing are accomplished by a combination of random replica placement for fast parallel repair and targeted replica placement for load balancing. However, as will be understood, the present invention is not limited to placing replicas on bricks, but may also apply to replication in general. As such, any of the examples mentioned herein are non-limiting, and the present invention may be used various ways that provide benefits and advantages in computing in general.

Figure 2:
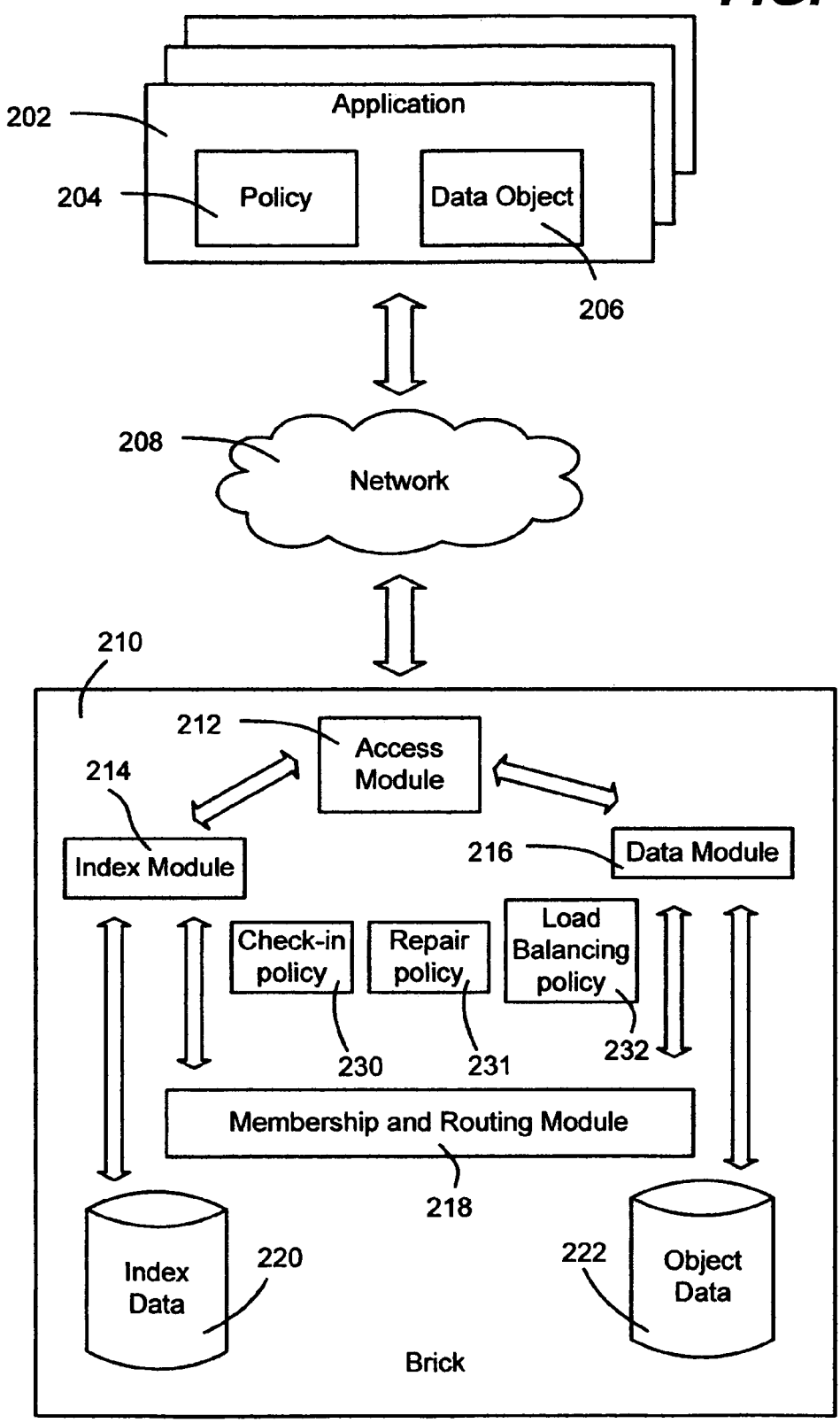
FIG. 2 is a block diagram representing an example system node, or brick, including policies for handling replica placement in accordance with various aspects of the present invention.

Turning to FIG. 2 of the drawings, there is shown a block diagram generally representing an exemplary architecture of system components for a distributed object store. As can be readily appreciated, the functionality implemented within the blocks illustrated FIG. 2 may be implemented as additional separate components, or the functionality of several or all of the blocks may be implemented within a lesser number of components. Moreover, although FIG. 2 shows a single system node containing index data and object data, as well as components for working with that data, as described below it will be understood that a given node may contain only some of these components.

As used herein, an object store may mean a large distributed system of operably coupled nodes, referred to herein as bricks. In various embodiments, one or more application programs 202 may be operably coupled to one or more bricks 210 by a network 208. In general, an application program 202 may be any type of executable software code such as a kernel component, a conventional application program running on top of an operating system, a linked library, an object with methods, and so forth. In one embodiment, an application program may execute on a client computer or computing device, such as computer system environment 100 of FIG. 1 which may be operably coupled to one or more bricks 210 by the network 208, wherein the network 208 may be any type of network such as the internet or another WAN or LAN as described with reference to FIG. 1. An application 202 may include one or more policies 204 and one or more data objects 206. A policy 204 may generally include instructions for data object placement and replication in the distributed object store.

Data object replicas may be placed on any bricks, according to various check-in, data repair and load balancing policies, described below. The replication degree, or number of replicas, may be specified for an individual data object and the replication degree may be different from object to object, may be a default value and/or may be enforced system-wide. A data object 206 may represent any type of data for storage in the distributed object store. For example, a data object may be any type of file or files, including a document, spreadsheet, data base, executable code and so forth. An object within the distributed object store may be immutable, meaning the object may not be modified once placed into the distributed object store. In order to change an object, a new object may be created and the new object may be put into the object store. In one embodiment, the old object may be subsequently deleted.

A brick 210 may be any type of computer system or computing device such as including some or all of the components described in the computer system environment 100 of FIG. 1. A brick 210 may include an access module 212, an index module 214, a data module 216, and a membership and routing module 218. Each of these modules may also be any type of executable software code such as a kernel component, an application program, a linked library, an object with methods, or other type of executable software code. A brick 210 containing an operable index module 214 may be referred to as an index node, while a brick 210 containing an operable data module 216 may be referred to as a data node. A brick may comprise an index node, a data node, or both.

The access module 212 may only be present on some bricks and may be responsible for communicating with clients. The index module 214 also may be only present on some bricks and may be responsible for indexing among index data 220 a subset of data objects stored in an object data store 222. The logical space of object identifiers may be partitioned into subsets and each index node may be responsible for indexing data objects whose identifiers belong to a given subset. For example, if the object identifiers are randomly chosen globally unique identifiers (GUIDs), then the subsets of object identifiers may be partitioned so that the data objects referenced by the object identifiers may be distributed among the subsets of object identifiers. In this way, responsibility for tracking a large number of objects may be evenly spread among the index nodes.

An index built by the index module 214 may include information about a replica set for each object such as an indication of bricks on which replicas of the object may be stored. For instance, an index may maintain a list of locations or pointers to all the copies of a data object. There may also be a replication degree defined for each object that specifies the number of copies of the object desired to be stored in the distributed object store. The replication degree may be stored as metadata associated with every copy of a data object. During some transient state or condition, there may be fewer copies than the number of copies specified by the replication degree due to node failure, in which case any copies of the data objects on failed nodes may no longer be available for access. It may be the responsibility of the index module 214 to track such a repair situation and remedy it, for example, by directing creation of new copies until the desired number of available replicas may be stored in the object store. As described below, different types of replicas are distributed among the object store.

The data module 216 may also be only present on some bricks and may be responsible for keeping track of what data objects may be stored on the computer storage media of that brick. The data module 216 may also keep track of the index nodes responsible for indexing those data objects as well. In the event that an index node may fail, data modules may be notified by the membership and routing module 218 and each data module may determine a new index node that may be responsible for indexing the data objects. In one embodiment, the data module 216 may then report to that index module 214 what data objects it should be indexing.

In general, an index module 214 on a brick may hold the indices for data objects rooted at that node. The data module 216 on a brick may hold data objects and may also maintain reverse tables that may include references that point to the root nodes of those data objects stored. In this manner, multiple bricks may be networked together to behave as a large distributed object store. The operations that may be supported as an interface to the object store may be an object check-in operation, wherein to store an object in the object store, a check-in API may be provided. The API may further include object retrieval and object deletion operations, as well as other operations.

As described above, not only may replicas for new objects be created by an application program and placed via a check-in operation, but bricks may fail, and thus additional replicas need to be created to maintain the proper number of replicas for each object in the system, preferably in a manner that facilitates fast repair. Moreover, load balancing may occur, whereby replicas are strategically placed on bricks such that each brick in the system tends to become approximately equally loaded and thus accessed the same amount. Note that load balancing may be triggered by a brick that recognizes that it (or another brick) is more loaded than other bricks. New bricks may also be added to the system, whereby load balancing may occur to fill the new bricks.

In accordance with various aspects of the present invention, hybrid object placement addresses the issues of supporting fast data repair as well as load balancing, which as described above are otherwise somewhat conflicting goals. For example, if new bricks are added, for load balancing it would be desirable to place all newly created replicas on the new bricks. However, by being placed on the new bricks, such replicas would not be randomly distributed among a large number of the system bricks, thus hindering fast data repair based on parallel I/O, because too many of the replicas are on the newly added bricks.

To accomplish hybrid object placement, a differentiation is made between the roles of multiple replicas, such that some replicas are mainly for supporting fast parallel repair while other replicas are mainly for supporting load balancing.

As defined herein, a replica for supporting fast parallel repair is called a spreading replica, and such a spreading replica is placed randomly on a brick in the system. Because of the random placement, when a brick fails, the spreading replicas corresponding to the replicas on the failed brick are spread across many bricks, and thus ensure a large number of parallel repair sources. A replica for supporting load balancing is called a smoothing replica; a smoothing replica is typically placed on a low-load brick to smooth the loads among all bricks. By separating the roles of the replicas, the system achieves both fast repair and good load balancing.

To assign different roles to replicas, that is, to assign some of the replicas as spreading replicas that are spread uniformly to a large number of bricks to support parallel repair, and assign other replicas as smoothing replicas placed among lowest usage bricks to support load balancing, a separate indexing structure is used to keep the information about whether a replica is a spreading or a smoothing replica. Note that this may be a flag or other tag associated with each object's identity in each indexing structure. The indexing structure may be centrally located, e.g., if there is one node that is responsible for others it would keep the index, or multiple indices may be distributed among the nodes of the system, which communicate with each other. Note that other mechanisms are feasible, e.g., each replica may be tagged with a metadata attribute indicative of spreading or smoothing, with that attribute then used by another entity to determine placement.

The present system ensures that at least some number t out of a total of k replicas are spreading replicas and the rest are smoothing replicas. By way of example, in FIGS. 3A-3C described below, the total number of replicas k is set to 3 replicas, and the number of spreading replicas t is set to 2. With at least two spreading replicas, the system guarantees that when there is a brick failure, at least one other spreading replica may be found for every object replica on the failed brick, and that spreading replica used as the repair source, thereby achieving parallel repair to a good statistical degree. Note that at least one remaining spreading replica is sufficient to achieve a good parallel repair degree. In addition, the system performs background load-balancing as necessary, and leverages the smoothing replicas to ensure that lower-usage bricks get used first.

The placement of a replica set is thus performed at different times, based on a placement policy for check-in of a new replica, a placement policy for data repair, and a placement policy for load-balancing. FIGS. 3A-5B are examples of the placement policies for check-in (FIGS. 3A-3C), data repair (FIGS. 4A-4B), and load balancing (FIGS. 5A-5B), respectively.

Figure 3A:
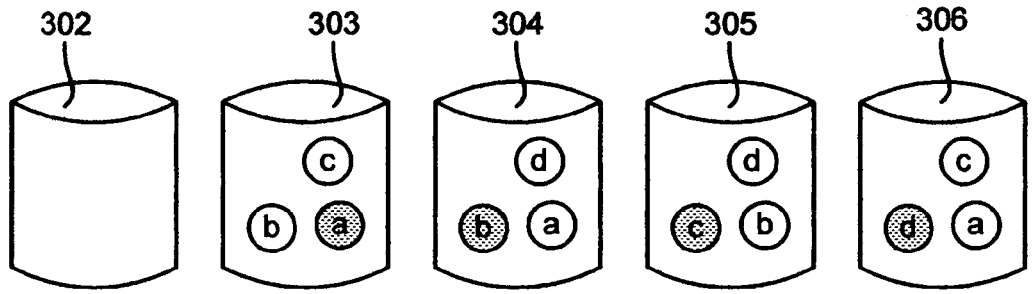
FIGS. 3A-3C are representations of objects being checked into the system and placed among bricks based on a check-in policy in accordance with various aspects of the present invention.
Figure 3B:
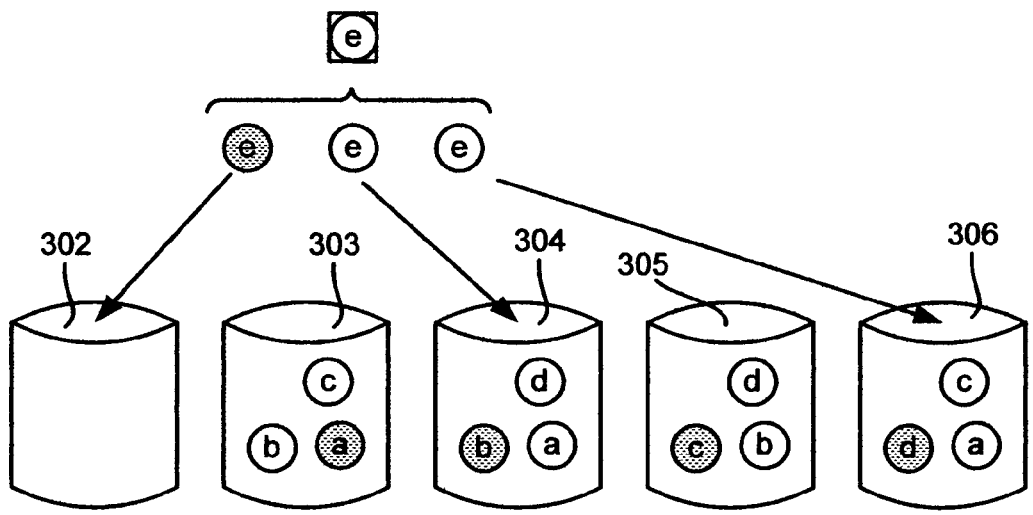
Figure 3C:
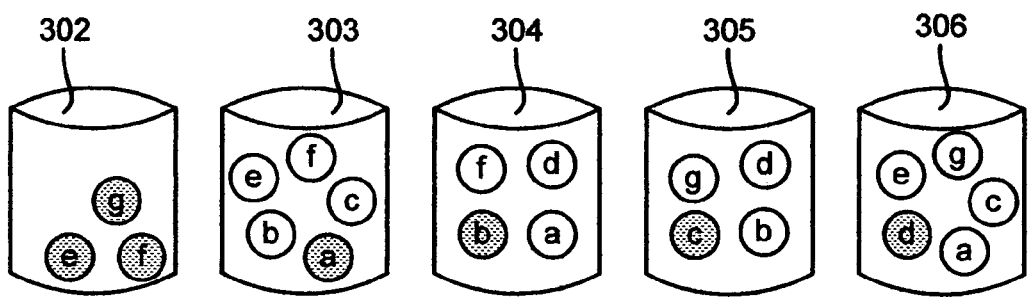

As represented in FIGS. 3A-3C, when a new object is checked in, and the number of spreading replicas (t) is two, two replicas are placed at random as spreading replicas. The bricks for the spreading replicas may be selected by random number generation, with a check to ensure that the same brick does not receive more than one of the replicas. Any remaining k-t replicas are placed among the lowest usage bricks as the smoothing replicas. For example, if a system keeps k=4 replicas, with t=2, two are spreading replicas and two are smoothing replicas; if k=3 total replicas are kept as in the examples of FIGS. 3A-3C, two are spreading replicas and one is a smoothing replica. The lowest usage bricks may be determined by some threshold value, e.g., the smoothing replicas may be randomly distributed among the lowest ten percent of all system bricks based on load, where load typically corresponds to the number and total size of replicas on each brick.

FIGS. 3A-3C illustrate an example placement policy for a check-in operation. Initially, brick 302 has a low disk usage (FIG. 3A). When a new object "e" is checked in, based on a check-in policy 230 (FIG. 2), the object "e" has three replicas placed therefor, one of which is smoothing replica while the other two are spreading replicas. Note that in FIGS. 3A-3C, as well as in the other examples, the smoothing replicas are shown as shaded, while the spreading replicas are shown as unshaded.

As represented in FIG. 3B, the smoothing replica (shaded, circled e) is placed on the lowest usage brick 302, while the other two spreading replicas (each an unshaded, circled e) are randomly placed in the remaining bricks, which in this example are the brick 304 and the brick 306.

As represented in FIG. 3C, after checking in more objects, namely "f" and "g" objects, the load of the brick 302 is getting close to other bricks in the system. This is apparent from the number of objects on each brick, and occurs because the smoothing replicas are always sent to the lowest-usage brick (in actuality, they are randomly distributed among a set of lowest-usage bricks) ensuring that those bricks become used.

Figure 4A:
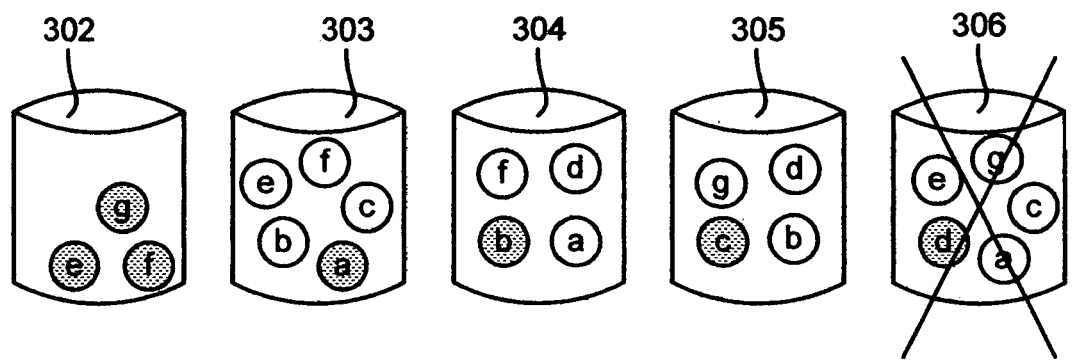
FIGS. 4A and 4B are representations of objects being placed as part of a data repair policy in accordance with various aspects of the present invention.
Figure 4B:
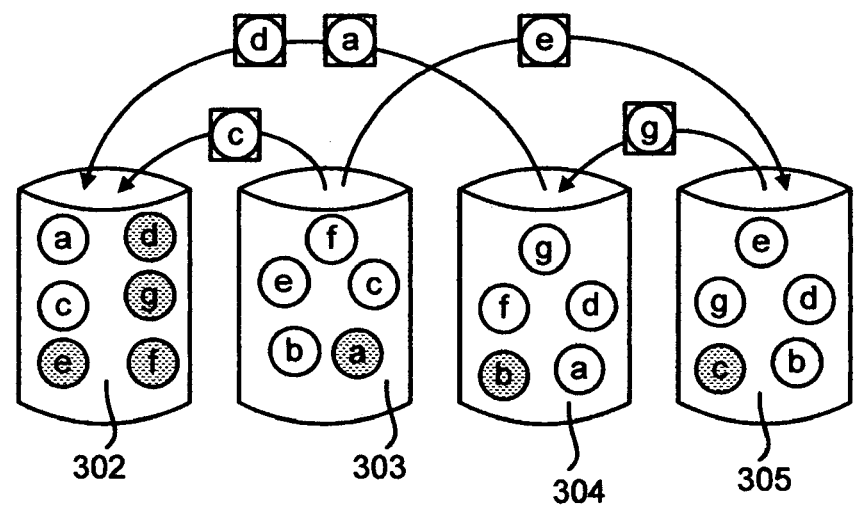

FIGS. 4A-4B represents the general policy 231 (FIG. 2) for data repair. In general, when a brick fails, for an index node brick that contains the index of an object that has a replica on a brick, the index node chooses a spreading replica of the object as the repair source if possible, and chooses a brick at random as the repair destination for the object. The new replica is assigned as a spreading replica.

Thus, in this example, when the brick 306 fails as represented in FIG. 4A by the crossed-out "X" over brick 306, the replicas on it are inaccessible, and thus replicas from other bricks will be copied to other bricks. Whenever possible, the system chooses spreading replicas as the repair sources to ensure more parallel data repair, as represented in FIG. 4B.

For a single brick failure, there is at least one spreading replica for every object on the failed brick, and thus using this repair policy 231 guarantees a good spread of repair sources and repair destinations, whereby fast repair is achieved. For multiple concurrent brick failures, it is possible that all spreading replicas for an object are gone, and the system has to select a smoothing replica as the repair source. This is generally not an issue because the number of objects that lose all spreading replicas is small, because the spreading replicas are randomly distributed, and because data repair gives higher priority to objects that lose multiple replicas.

Another policy, represented in FIG. 2 as the policy 232 is for background load balancing. To this end, when the system load is not balanced to a certain degree, which is information that is easily communicated among the nodes, a background load balancing operation is triggered to move some of the replicas on overloaded bricks to one of the lower loaded bricks. The selection gives higher priority to smoothing replicas for the movement.

More particularly, the load balancing policy 232 utilizes the role separation of object replicas to achieve load balancing while supporting rapid parallel repair, by giving a higher priority to move the smoothing replicas first whereby that the spreading replicas remain placed at random bricks.

Figure 5A:
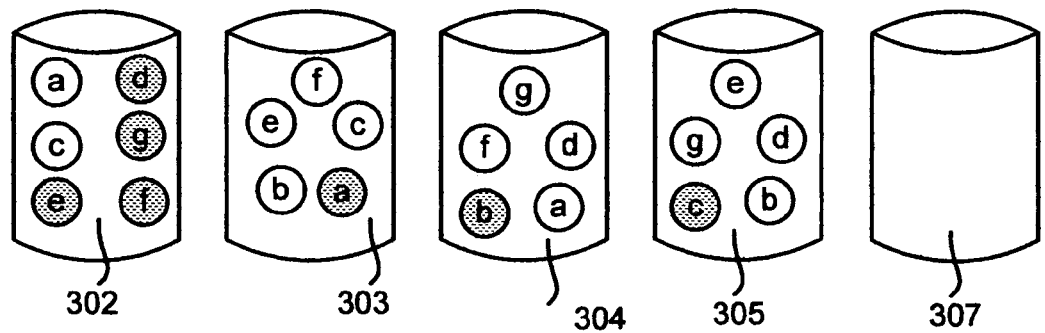
FIGS. 5A and 5B are representations of objects being placed as part of a load balancing policy in accordance with various aspects of the present invention.
Figure 5B:
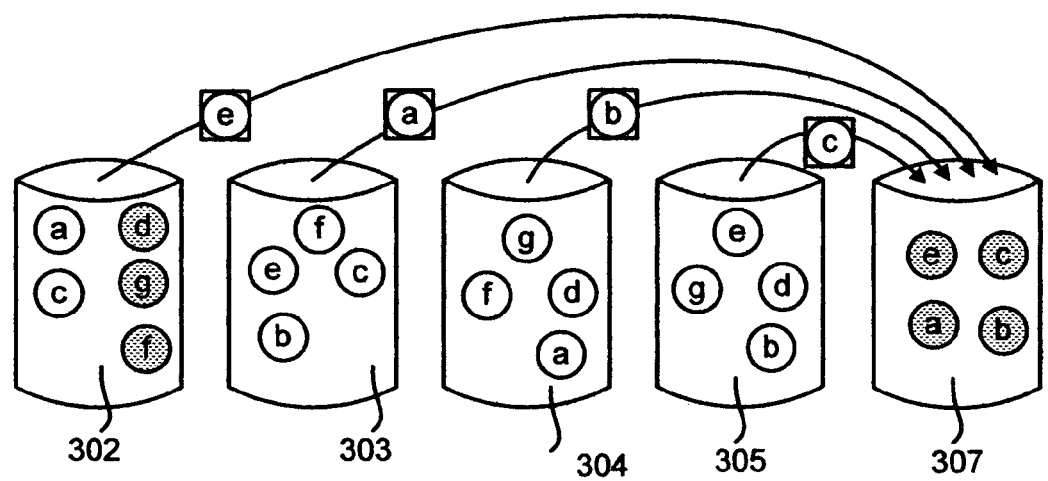

FIGS. 5A and 5B illustrate the scenario of background load balancing. When a new brick 307 is added to the system (FIG. 5A), background load balancing is triggered, and the existing bricks 302-305 with high loads move their smoothing replicas a, b, c, and e to the new brick 307, as represented in FIG. 5B. This provides a more balanced load, while keeping spreading replicas randomly placed for parallel data repair.

The load balance policy assumes that each brick has a certain knowledge of the storage utilization of other bricks in the system. Examples include the list of bottom-n and top-n bricks in terms of storage utilization, the first of which provides the candidates for load balance destinations, while the second identifies bricks on which objects should not be placed. Load balancing may be triggered when a brick finds that its utilization is certain percentage (e.g. ten percent) over that of the average of all bricks, in which case the brick will attempt to migrate some of its replicas to other bricks. If a master node runs the system, then load balancing and the other policy operations are straightforward, however if not, pre-communication between nodes before starting operations is necessary to avoid conflicts such as race conditions. For example, a brick will communicate its intentions to other bricks, to avoid a situation in which two bricks may each want to load balance by coincidentally migrating the same object replica to a common other brick, whereby not enough replicas of an object will exist on distinct bricks in the system.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having stored computer-executable instructions, which executed to perform a method for facilitating data repair and load balancing in a distributed object store by differentiating replicas as smoothing replicas or spreading replicas, the method comprising:

receiving a request to add an object to a distributed object store;

in response to the request, accessing a check-in policy to determine a number and type of replicas of the object to generate, wherein types of replicas comprise spreading replicas and smoothing replicas;

generating a number of smoothing replicas specified in the check-in policy;

placing each smoothing replica of the smoothing replicas by performing following steps for said each smoothing replica that is generated:

determining a set of lowest usage bricks of the distributed object store;

selecting a brick from among the set of lowest usage bricks; and placing the smoothing replica on the selected brick;

generating a number of spreading replicas specified in the check-in policy; and placing each spreading replica of spreading replicas by performing following steps for said each spreading replica that is generated:

randomly selecting a brick from among all the bricks of the distributed object store;

performing a check to determine that a spreading replica of the object has not previously been placed on the selected brick; and placing the spreading replica on the selected brick if no spreading replica of the object has previously been placed on the selected brick;

upon a failure of a first brick which stores a first replica, selecting a second replica on a second brick, the second replica corresponding to the first replica; and copying the second replica to a third brick based on a data repair policy wherein the third brick is randomly selected from among all the bricks of the distributed object store, wherein the data repair policy specifies selecting a spreading replica as the second replica for copying if at least one spreading replica is available.

2. The computer-readable storage medium of claim 1 wherein the check-in policy places at least two replicas as spreading replicas and at least one other replica as a smoothing replica.

3. The computer-readable storage medium of claim 1 having further computer-executable instructions comprising moving a replica from one brick to another brick based on a load balancing policy.

4. The computer-readable storage medium of claim 3 wherein the load balancing policy is triggered by at least one of adding at least one new brick to a system of bricks, or deleting objects and causing a load imbalance among the bricks.

5. The computer-readable storage medium of claim 3 wherein the load balancing policy specifies selecting a smoothing replica for moving if at least one smoothing replica is available.

6. The computer-readable storage medium of claim 1 having further computer-executable instructions comprising maintaining at least one index having information therein that indicates whether a replica is a smoothing replica or a spreading replica.

7. A method for facilitating data repair and load balancing in a distributed object store by differentiating replicas as smoothing replicas or spreading replicas, in a computing environment in which objects are replicated among bricks of a distributed object store, the method comprising:
   receiving, by using a computer including a processor, a request to add an object to a distributed object store;
   in response to the request, accessing a check-in policy to determine a number and type of replicas of the object to generate, wherein types of replicas comprise spreading replicas and smoothing replicas;
   generating a number of smoothing replicas specified in the check-in policy;
   placing each smoothing replica of smoothing replicas by performing following steps for said each smoothing replica that is generated:
      determining a set of lowest usage bricks of the distributed object store;
      selecting a brick from among the set of lowest usage bricks; and
      placing said each smoothing replica on the selected brick;
   generating a number of spreading replicas specified in the check-in policy; and
   placing each spreading replica of spreading replicas by performing following steps for said each spreading replica that is generated:
      randomly selecting a brick from among all the bricks of the distributed object store;
      performing a check to determine that a spreading replica of the object has not previously been placed on the selected brick; and
      placing the spreading replica on the selected brick if no spreading replica of the object has previously been placed on the selected brick;
   upon a failure of a first brick which stores a first replica, selecting a second replica on a second brick, the second replica corresponding to the first replica; and
   copying the second replica to a third brick based on a data repair policy wherein the third brick is randomly selected from among all the bricks of the distributed object store, wherein the data repair policy specifies selecting a spreading replica as the second replica for copying if at least one spreading replica is available.

8. The method of claim 7 further comprising:
   upon a failure of a first brick which stores a first replica, selecting a second replica on a second brick, the second replica corresponding to the first replica; and
      copying the second replica to a third brick based on a data repair policy wherein the third brick is randomly selected from among all the bricks of the distributed object store.

9. The method of claim 7 further comprising, moving a spreading replica to a different brick based on relative loading among bricks.

10. The method of claim 7 further comprising maintaining information in at least one index that correlates replicas to bricks, wherein the at least one index includes data that indicates whether a replica is a smoothing replica or a spreading replica.

11. A system for facilitating data repair and load balancing in a distributed object store by differentiating replicas as smoothing replicas or spreading replicas, the system comprising:
   a processor; and
   memory storing computer executable instructions that when executed by the processor perform a method comprising:
   receiving a request to add an object to a distributed object store;
   in response to the request, accessing a check-in policy to determine a number and type of replicas of the object to generate, wherein types of replicas comprise spreading replicas and smoothing replicas;
   generating a number of smoothing replicas specified in the check-in policy;
   placing each smoothing replica of smoothing replicas by performing following steps for said each smoothing replica that is generated:
      determining a set of lowest usage bricks of the distributed object store;
      selecting a brick from among the set of lowest usage bricks; and
      placing said each smoothing replica on the selected brick;
   generating a number of spreading replicas specified in the check-in policy; and
   placing each spreading replica of the spreading replicas by performing following steps for each spreading replica that is generated:
      randomly selecting a brick from among all the bricks of the distributed object store;
      performing a check to determine that a spreading replica of the object has not previously been placed on the selected brick; and
   placing the spreading replica on the selected brick if no spreading replica of the object has previously been placed on the selected brick;
   upon a failure of a first brick which stores a first replica, selecting a second replica on a second brick, the second replica corresponding to the first replica; and
   copying the second replica to a third brick based on a data repair policy wherein the third brick is randomly selected from among all the bricks of the distributed object store, wherein the data repair policy specifies selecting a spreading replica as the second replica for copying if at least one spreading replica is available.

12. The system of claim 11 wherein the method further comprises:
   upon a failure of a first brick which stores a first replica, selecting a second replica on a second brick, the second replica corresponding to the first replica; and
   copying the second replica to a third brick based on a data repair policy wherein the third brick is randomly selected from among all the bricks of the distributed object store.

* * * * *